United States Patent [19]

Goda

[11] Patent Number: 4,806,784
[45] Date of Patent: Feb. 21, 1989

[54] REMOTE CONTROL SYSTEM FOR A DISPLAY APPARATUS

[75] Inventor: Shigeru Goda, Kakogawa, Japan

[73] Assignee: Daiwa Shinku Corporation, Hyogo, Japan

[21] Appl. No.: 109,477

[22] Filed: Oct. 16, 1987

[30] Foreign Application Priority Data

Oct. 17, 1986 [JP] Japan .................................. 61-248127

[51] Int. Cl.$^4$ ......................... H01H 47/00; G09G 3/00
[52] U.S. Cl. ..................................... 307/125; 307/126; 340/811
[58] Field of Search ............... 307/125, 126, 140, 112; 340/811

[56] References Cited

U.S. PATENT DOCUMENTS

3,732,558  5/1973  Justice .................................. 340/811

*Primary Examiner*—William M. Shoop, Jr.
*Assistant Examiner*—Sharon D. Logan
*Attorney, Agent, or Firm*—Koda and Androlia

[57] ABSTRACT

A remote control system for remotely switching an electric power supply to the display section of a display apparatus whose display data control section and display section are located far from each other and separately power-supplied from their respective local commercial power sources. This system fundamentally consists of three elements: an oscillator, a counter devised so as to output a switch opening signal after counting out a predetermined number of pulses outputted from the oscillator, and a relay switch inserted in the power supply line of the display section and to be made open by the switch opening signal from the counter. The counter is further supplied at its reset terminal with clock signals transmitted to the display section from the display data control section. Thus, while display data control section separately power-supplied continues to output said clock signals, the counter does not output the switch opening signal, leaving the relay switch kept closed. Only when the clock signals remain stopped for a predetermined period of time, the relay switch is made open to cut off the power supply to the display section.

3 Claims, 1 Drawing Sheet

REMOTE CONTROL SYSTEM FOR A DISPLAY APPARATUS

BACKGROUND OF THE INVENTION

The present invention relates to a remote control system for a display apparatus, and more particularly to a system for remotely controlling the power supply to the display section of a display apparatus having its display and display data control sections separately located far from each other.

Suppose, for instance, a display for advertisement or various kinds of public information such as a weather forecast, news and traffic conditions on roads. In general, a display apparatus for those purposes has its display section made large-sized and positioned at a high place such as the top of a building and of a pole or tower provided to support the same. As a result, the signals to control the display section so as to make it display information purposefully are usually transmitted from a remotely provided display data control section through an electrical or optical transmission line, while the electric power necessary to keep the display section operative is preferably supplied locally to avoid long wiring of the power line. In such a way of power supply to the display section the switching of the power line has so far been operated manually or by means of a timer. However, the manual operation is very troublesome especially in case the apparatus being intermittently put into action, while the use of a conventional timer is accompanied by laborious work of setting on the timer various periods of operation time in accordance with a time schedule of putting the apparatus into action. Another method in use for switching is to provide a special remote switching device only for switching the power source to the display section, but this method causes a whole apparatus to be not only complex but also expensive. Nevertheless, it is wasteful in power consumption to leave the display section energized always.

OBJECTS AND SUMMARY OF THE INVENTION

The present invention, therefore, aims at eliminating such disadvantages and difficulties as are mentioned above in regard to the switching of the power source to the display section which is located remotely from the display data control section and supplied with power locally and makes it an object to provide a power source switching system for remotely controlling a display apparatus so that its remotely located display section may be energized only when supplied with clock signals.

Another object of the present invention is to constitute such a system in a simple constitution.

To achieve the above objects, the power source switching system according to the present invention consists fundamentally of a relay switch, a counter and an oscillator. The relay switch is inserted in the power line to the display section, while the counter outputs a switch openning signal to open the relay switch after counting a predetermined number of pulses outputted from the oscillator. Further, the counter is supplied at its rest terminal with the same clock signals that are transmitted from display data control section to the display section to make it display some information. Accordingly, while the display section is being instructed to display information, the clock signals continually reset the counter to prevent the same from counting out the predetermined number of the pulses from the oscillator. This causes the relay switch to be kept closed to supply an electric power to the display section. On the other hand, if the clock signals remain stopped for a time longer than a predetermined period corresponding to the time needed for the counter to count out the above-mentioned predetermined number of pulses from the oscillator, the counter outputs the switch openning signal to cut off the power to the display section.

BRIEF DESCRIPTION OF THE DRAWINGS

In the following the present invention is described in further detail on reference to the accompanying drawings, in which.

DETAILED DESCRIPTION OF THE INVENTION

Figure 1:
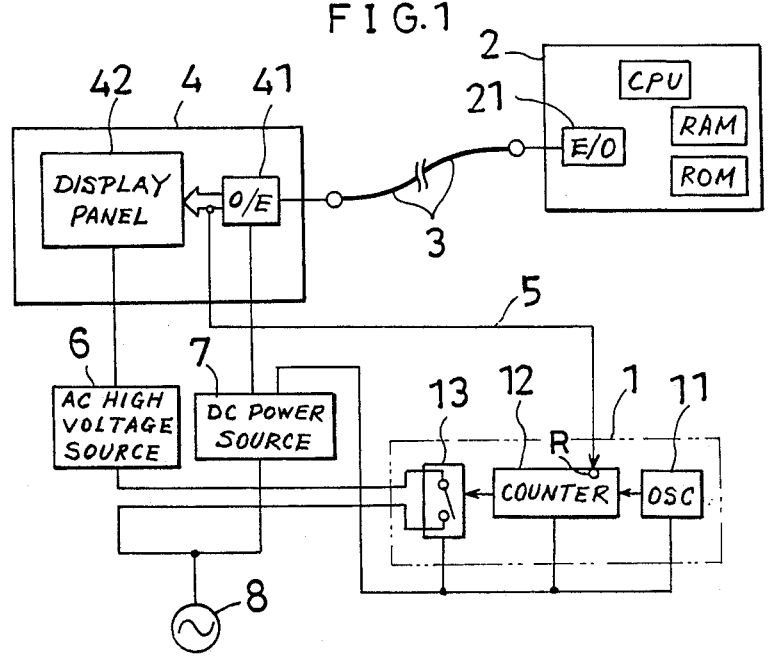
FIG. 1 blockdiagrammatically shows an embodiment of the present invention as applied to a conventional electrostatic display apparatus.

FIG. 1 shows a blockdiagrammatical constitution of an embodiment 1 of the present invention as applied to an electrostatic display apparatus consisting of a computerized display data control section 2 and a remotely located display section 4, both being connected to each other through an optical fiber signal transmission line 3. In advance of proceeding with the details of the invention, the display apparatus to which the embodiment 1 is briefed.

The display data control section 2 produces a series of pulsed display data signals according to the display information stored in a memory provided therein. The pulsed display data signals are converted to optical signals by an electrosignal-to-photosignal converter 21 and outputted through the optical fiber signal transmission line 3 to the display section 4. The display section 4 consists fundamentally of a photosignal-to-electrosignal converter 41 and a display panel 42 consisting of a plurality of electrostatic display elements arranged so as to form a matrix. The optical signal received by the display section 4 are reconverted to the original display data signals at the photosignal-to-electrosignal converter 41. The display data signals, which comprise display information data, display instruction data and clock signals, operate the individual electrostatic display elements purposefully by changing the polarity of high AC voltage externally supplied thereto from a high AC voltage source 6. The high AC voltage source 6 is made up of a step-up transformer supplied with its primary power from a local commercial power source 8, which supplies power also to a DC power source 7 for energizing the photosignal-to-electrosignal converter 41 of the display section 4.

With the description turned to the invention, the embodiment 1 of the invention comprises an oscillator 11, a counter 12 and a relay switch 13, which is to control the power supply to the above-mentioned high AC voltage source 6 from the commercial power source 8. The counter 12 is devised so as to outputs a switch openning signal after counting a predetermined number of pulses outputted from the oscillator 11, while the relay switch 13 is made open by said switch openning signal. All the constituents 11, 12 and 13 of the embodiment are also power-supplied from the DC power source 7. In addition to such a constitution of the embodiment, the counter 12 has its reset terminal R supplied with the previously mentioned clock signals, which branches out from the display section 4 to the terminal R through a branch line 5. Accordingly, while the clock signals are continually inputted to the reset terminal R of the counter 12 without a long time interval between the signals, namely, while the whole display apparatus (consisting of the display data control section 2, the display section 4 and the signal transmission line 3) is to be continually put into action, the counter 12 can not count out the predetermined number of the pulses from the oscillator 11, and therefore does not output the switch openning signal. Thus the relay switch 13 is kept closed to leave the display section 4 continuously energized from the commercial AC power source 8.

On the other hand, if the clock signals stop for a time longer than a predetermined period corresponding to the time needed for the counter 12 to count out the predetermined number of the pulses from the oscillator 11, the counter 12 outputs a switch openning signal to make the relay switch 13 open, and accordingly the AC power supply to the display section 4 is made cut off. Thus the wasteful power consumed when the display apparatus is kept non-operating is largely suppressed, though the signal converter 41 is left to consume a small amount of power supplied from the DC power source 7.

In constructing the present invention in practice, however, it should be noticed that the frequency of the oscillator 11 is preferably chosen to be much lower than that of the previously mentioned clock signals inputted to the reset terminal R of the counter 12. The frequency of the clock signals is widely varied in accordance with a selected display mode, which specifies an animated display, a scrowling display, a stop pattern display or the like. In addition there may be put a time interval ranging from one to several seconds between two successive series of the clock signals. Therefore, it is necessary to make the counter 12 have a relatively long time, for example, of one minute of longer before outputting the switch openning signal by counting out a predetermined number of the pulsed from the oscillator 11. To make the counter 12 comply with such a condition, the counter 12 must have a very large capacity of counting, if the frequency of the oscillator 11 is not sufficiently low. It is economically disadvantageous to use a counter having an unnecessarily large counting capacity.

Figure 2:
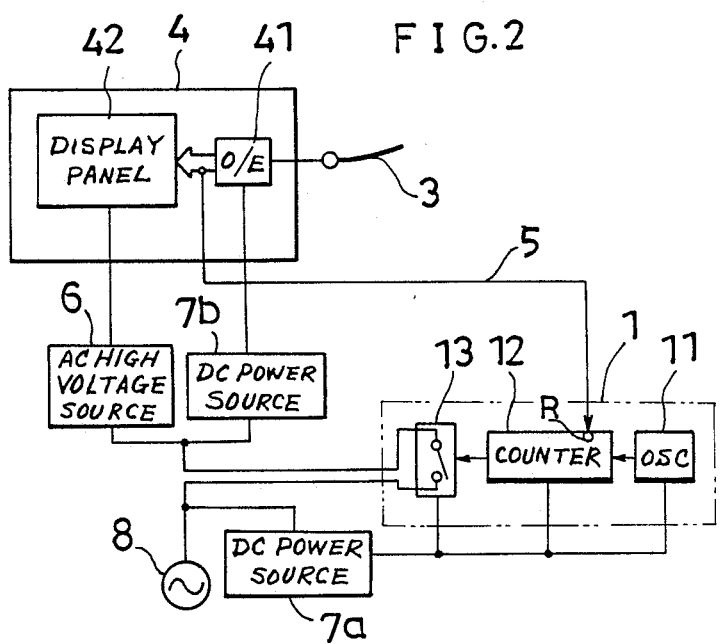
FIG. 2 shows another way of application of the above embodiment to the above display apparatus.

Further, the present invention can be applied also as shown in FIG. 2, in which the display data control section 2 is omitted. Referring to FIG. 2, the same switching system as the embodiment 1 shown in FIG. 1 is power-supplied from a DC power source 7a provided separately from abother DC power source 7b which supplies power only to the display section 4. Both the high AC voltage source 6 and the DC power source 7b are to be commonly switched by the relay switch 13 contained in the present invention. According to this manner of power supply, a wasteful power consumption by the display section 4 is completely eliminated when the display apparatus is out of operation.

I claim:

1. A remote control system for use in a display apparatus which comprises a display section and a display data control located remotely from said display data control section, said display section functioning in accordance with display data signals outputted from said display data control section together with clock signals, said remote control system comprising:
   a relay switch for switching an electric power supply provided near said display section to energize the same; and
   a timer to be reset by said clock signals, said timer outputting in the laps of a predetermined period of time after being reset a switching signal to keep said relay switch open.

2. A remote control system for use in a display apparatus which comprises a display section and a display data control section which as a memory to store display data and outputs clock signals and a series of digital data signals, both being based on said display data stored in said memory, said remote control system comprising:
   a relay switch for switching an electric power source to said display section; and
   a timer devised so as to output a switching signal to make said relay switch open only when said clock signals remain stopped for a predetermined period of time, said timer comprising an oscillator and a counter having a reset terminal and being devised so as to output said switching signal after counting a predetermined number of pulses outputted from said oscillator, said counter being supplied at said reset terminal with said clock signals.

3. A remote control system defined in claim 2, wherein the frequency of said pulses outputted from said oscillator is lower than the frequency of said clock signals.

* * * * *